(12) United States Patent
Veldman et al.

(10) Patent No.: US 7,758,462 B2
(45) Date of Patent: Jul. 20, 2010

(54) PIN RETENTION AND ASSEMBLY SYSTEM FOR LOCKING DIFFERENTIAL

(75) Inventors: Robert F. Veldman, Brighton, MI (US); Jeffrey L. Lubben, Pinckney, MI (US); Zhipeng Han, Canton, MI (US); Greg Sabourin, Spring Arbor, MI (US)

(73) Assignee: Metaldyne, LLC, Plymouth, MI (US)

( * ) Notice: Subject to any disclaimer, the term of this patent is extended or adjusted under 35 U.S.C. 154(b) by 210 days.

(21) Appl. No.: 11/726,743

(22) Filed: Mar. 22, 2007

(65) Prior Publication Data

US 2007/0225106 A1    Sep. 27, 2007

Related U.S. Application Data

(60) Provisional application No. 60/784,843, filed on Mar. 22, 2006, provisional application No. 60/784,842, filed on Mar. 22, 2006, provisional application No. 60/789,080, filed on Apr. 4, 2006.

(51) Int. Cl.
  *F16H 48/20* (2006.01)
  *F16H 48/30* (2006.01)
  *F16D 11/04* (2006.01)
(52) U.S. Cl. ............... 475/231; 475/237; 192/69.62
(58) Field of Classification Search ............ 475/231, 475/233, 237, 249, 250; 192/69.62, 69.71, 192/69.61
See application file for complete search history.

(56) References Cited

U.S. PATENT DOCUMENTS

| 751,787 | A | 2/1904 | Entriken |
| 851,956 | A | 4/1907 | McMahon |
| 964,387 | A | 7/1910 | Burnam |
| 1,017,407 | A | 2/1912 | Grabowsky |
| 1,032,261 | A | 7/1912 | Wright et al. |
| 1,125,079 | A | 1/1915 | Dyer |
| 1,145,295 | A | 7/1915 | De Witt |
| 1,193,017 | A | 8/1916 | Higinbotham |
| 1,272,081 | A | 7/1918 | Nutting et al. |
| 1,647,879 | A * | 11/1927 | Miller ............ 192/32 |
| 1,723,901 | A | 8/1929 | Todd |
| 2,017,577 | A | 10/1935 | Adams |
| 2,121,254 | A | 6/1938 | Meinke |
| 2,276,821 | A | 3/1942 | Boor |
| 2,626,032 | A | 1/1953 | De Coursey |
| 2,959,073 | A * | 11/1960 | Doerfer et al. ........ 475/348 |
| 3,072,235 | A | 1/1963 | Aschauer |
| 3,105,394 | A | 10/1963 | Salzmann |
| 3,732,752 | A | 5/1973 | Louckes et al. |

(Continued)

OTHER PUBLICATIONS

Intl Srch Rep/Written Op., Dec. 12, 2007, Metaldyne Company, LLC.

*Primary Examiner*—Roger Pang
(74) *Attorney, Agent, or Firm*—McDonald Hopkins LLC

(57) ABSTRACT

A pin retention and assembly system that is used with vehicles, such as, off-road vehicles is provided. The pin retention and assembly system has modular locking pins engaging a collar positionable about a bearing journal of a differential housing. Channels are formed in the bearing journal for receiving the locking pins. The channels aid in maximizing the size of the bearing journal. The locking pins engage the collar to lock the differential housing. In an embodiment, the locking pins and locking apertures in the differential housing are orientated asymmetrically causing the number of locking pins to be independent to the apertures in the side gear.

17 Claims, 6 Drawing Sheets

U.S. PATENT DOCUMENTS

| | | |
|---|---|---|
| 3,955,443 A | 5/1976 | Estrada |
| 4,043,224 A | 8/1977 | Quick |
| 4,504,094 A * | 3/1985 | Burrows .................... 301/6.1 |
| 4,529,080 A | 7/1985 | Dolan |
| 4,555,962 A | 12/1985 | Bucarelli |
| 4,901,599 A | 2/1990 | Irwin |
| 4,959,043 A | 9/1990 | Klotz et al. |
| 5,171,192 A | 12/1992 | Schlosser et al. |
| 5,183,446 A | 2/1993 | Hughes |
| 5,366,040 A * | 11/1994 | Irikura et al. ............... 180/244 |
| 5,554,081 A | 9/1996 | Bowerman |
| 5,718,653 A | 2/1998 | Showalter |
| 5,947,859 A | 9/1999 | McNamara |
| 5,996,720 A | 12/1999 | Hunt |
| 6,007,449 A * | 12/1999 | Okada et al. ................. 475/231 |
| 6,045,479 A | 4/2000 | Victoria et al. |
| 6,061,907 A | 5/2000 | Victoria et al. |
| 6,083,133 A | 7/2000 | Dye |
| 6,551,209 B2 | 4/2003 | Cheadle et al. |
| 6,780,137 B1 | 8/2004 | Langenfeld |
| 6,935,982 B2 | 8/2005 | Handa et al. |
| 6,945,898 B2 | 9/2005 | Szuba |
| 7,195,578 B2 * | 3/2007 | Dalenberg et al. .......... 475/331 |
| 2001/0021680 A1 * | 9/2001 | Okada ........................ 475/83 |
| 2004/0116235 A1 | 6/2004 | Szuba |

* cited by examiner

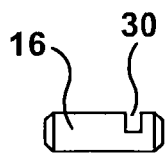
FIG. 7A  FIG. 7B
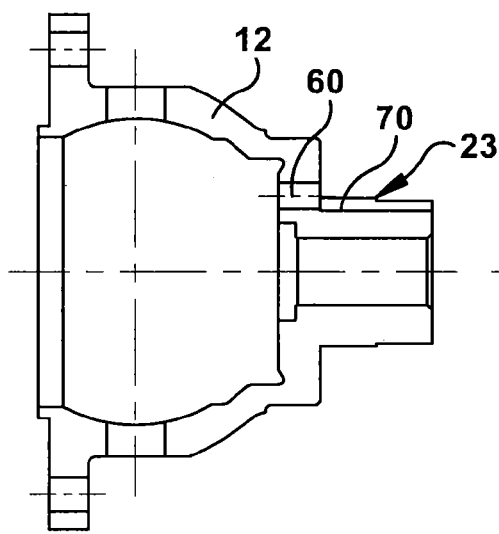
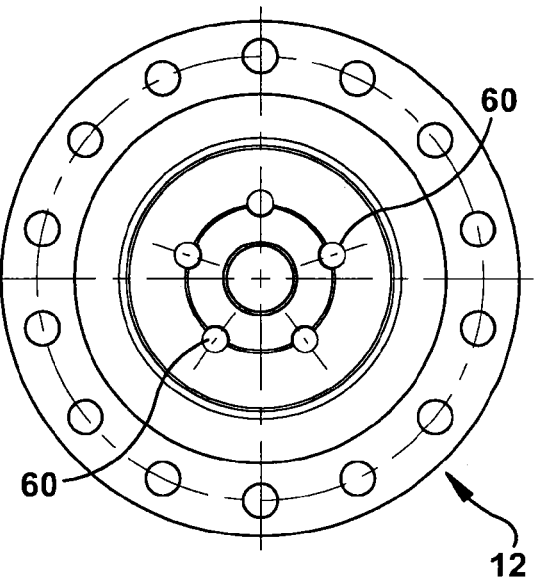
FIG. 6  FIG. 8
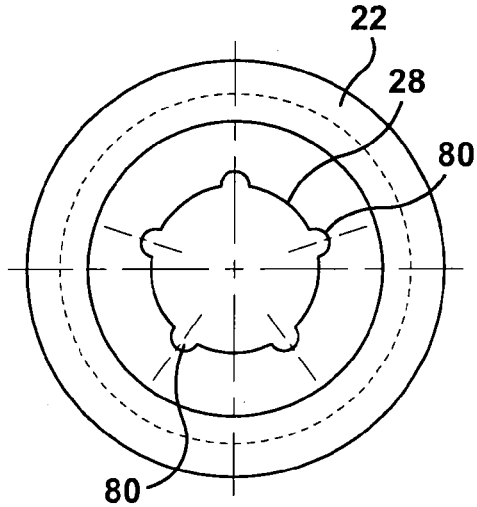
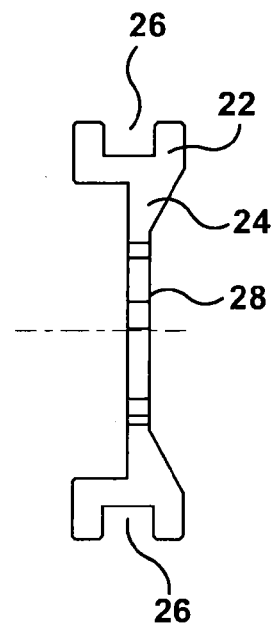
FIG. 9  FIG. 10

PIN RETENTION AND ASSEMBLY SYSTEM FOR LOCKING DIFFERENTIAL

CROSS-REFERENCE TO RELATED APPLICATIONS

This application claims priority from U.S. Provisional Patent Application No. 60/784,843 entitled "PIN RETENTION SYSTEM FOR LOCKING DIFFERENTIAL" filed on Mar. 22, 2006; U.S. Provisional Patent Application No. 60/784,842 entitled "PIN RETENTION AND ASSEMBLY SYSTEM FOR LOCKING DIFFERENTIAL" filed on Mar. 22, 2006; and U.S. Provisional Patent Application No. 60/789,080 entitled "LOCK PIN RADIAL ORIENTATION FOR A LOCKING DIFFERENTIAL" filed on Apr. 4, 2006, each of which is hereby incorporated by reference in its entirety.

FIELD OF THE INVENTION

The present invention generally relates to locking differentials, and more particularly, to a pin retention and assembly system for locking differentials.

BACKGROUND

Differentials are known in the automotive industry as devices that split engine torque two ways, allowing each output to spin at a different rate. Generally, differentials have three primary tasks: to aim the engine power at the wheels; to act as the final gear reduction in the vehicle, slowing the rotational speed of the transmission one final time before being transferred to the wheels; and to transmit the power to the wheels while allowing them to rotate at different speeds.

In a typical vehicle application, the rotating driveshaft of the vehicle engages a ring gear, which is mounted onto the differential housing. Thus, the driveshaft drives the ring gear, which in turn rotates the differential housing. A typical mechanical differential contains a housing (or carrier), two side gears, and several pinion gears. Pinion shafts attach the pinion gears to the housing so that as the housing rotates the pinion gears are driven. Specifically, inputting torque to the housing drives the pinion shaft that, in turn, drives the pinion gears. The pinion gears drive the two side gears, which in turn drive the axle (or half shafts) attached thereto.

Locking differentials are used predominantly on vehicles intended for off the road use, such as tractors, agricultural machines, military vehicles, all terrain vehicles, etc. Frequently, the half-shafts of off-road vehicles will experience different resistive couples due to, for example, the roughness of the ground and/or a slippery surface. In such a case, if the differential is not partially or totally excluded from functioning, then the half-shaft or the wheel experiencing the least amount of resistance from the ground will receive the majority of the power. As a result, the vehicle will lose traction.

Conventional locking differentials are constructed such that the pinion gears are mounted to the differential casing or housing and the differential input gear. The side gears engage the pinion gears to rotate the left and right axles. A typical locking differential includes apertures in the differential housing to allow locking pins to enter therethrough and engage the side gear. Therefore, the differential housing is locked so as not to transmit torque through the gear set by the locking pins engaging the side gears. When the differential is locked, e.g. the locking pins engage the side gear, the rear axles are locked together and rotate at the same speed. When the differential is to be unlocked, the locking pins are removed from the side gear and the rear axles are permitted to rotate at different speeds.

The locking pins are typically mounted to a circular collar. Therefore, when the collar is engaged, the collar and locking pins move axially relative to the differential housing. Specifically, the locking pins slide within the differential housing into engagement with the side gear, thus locking the differential housing relative to the gear set.

FIG. 1 illustrates a known locking differential design having five radial apertures 3 located symmetrically about a side gear 4. FIG. 2 illustrates a known differential housing 5 having locking apertures 6 that are positioned to correspond to the apertures 3 of the side gear 4. Specifically, the locking apertures 6 are spaced symmetrically about the housing 5. FIG. 3 illustrates a known collar 8 having equally symmetrically spaced pins 7 for engagement with the locking apertures 6 of the housing 5 and the apertures 3 of the side gear 4.

FIG. 4 illustrates how the components of FIGS. 1-3 interact in a known differential assembly 9. Specifically, the differential assembly 9 includes the differential housing 5, the side gears 4 and pinion gears 2. The known differential locking assembly 9 also has a bearing journal 11 formed therethrough. The bearing journal 11 is sized to receive front axles or rear axles of a vehicle (not shown) that are connected to the side gears 4.

A pinion shaft 10 attaches the pinion gears 2 to the housing 5. The collar 8 moves about the bearing journal 11 to engage the side gears 4 and the housing 5. The pins 7 are located radially outward from the bearing journal 11. More specifically, the locking pins 7 extend from the collar 8 into the housing 5. In use, each of the pins 7 engage the aperture 3 in the side gear 4 and the locking apertures 6 of the housing 5 to lock the housing 5 to the side gear 4.

Significant machining and complex assembly is needed for such known locking differentials. Particularly, the manufacture of the collar 8 and the locking pins 7 are required to be extremely precise so that each of the locking pins 7 enters each of the locking apertures 6 machined in the differential housing 5. Such manufacturing and assembly has created problems when one of the locking pins 7 is misaligned or one of the locking apertures 6 is slightly off-center. In addition, such precise machining is time-consuming and greatly increases manufacturing costs.

As illustrated in FIG. 4, the locking pins 7 and the locking apertures 6 have been located in a radial pattern significantly larger than the bearing journal 11. In several applications, it is desirable to reduce the overall radial pattern of the locking pins 7 while increasing or at least maintaining the size of the bearing journal 11. Further, there is always a desire to improve the manufacture and assembly of locking differentials.

However, efficient design of the locking differential depends on the size and stresses related to the components. There is a constant need in the art to minimize contact stresses and to achieve a compact sized differential. It is an object of the present invention to address these needs in providing an improved design. Further, there is a constant need in the field to improve upon component design and manufacturing and assembly techniques for locking differentials to reduce costs and time associated with all stages of manufacture and assembly.

SUMMARY OF THE INVENTION

A pin retention and assembly system that may be used with vehicles, such as, off-road vehicles is disclosed. The pin retention and assembly system has modular locking pins engaging a collar positionable about a bearing journal of a differential housing. Channels are formed in the bearing journal for receiving the locking pins. The locking pins engage the collar to lock the differential. In an embodiment, the locking pins and locking apertures in the differential housing are orientated asymmetrically so that the number of locking pins is independent to the number of apertures in the side gear.

DESCRIPTION OF THE DRAWINGS

Objects and advantages together with the operation of the invention may be better understood by reference to the following detailed description taken in connection with the following illustrations, wherein:

FIG. 6 illustrates another view of a differential housing having a bearing journal and channels formed therein in an embodiment of the present invention.

FIG. 7A is a side perspective view of a locking pin having a groove in an embodiment of the present invention.

FIG. 7B is a cross-sectional view of the locking pin of FIG. 7A.

FIG. 8 illustrates a differential housing having symmetrical locking apertures and channels in an embodiment of the present invention.

FIG. 9 illustrates a collar having half round apertures in an embodiment of the present invention.

FIG. 10 is a cross-sectional view of FIG. 9.

DETAILED DESCRIPTION

The present invention is directed to a pin retention and assembly system for a differential housing. It should be understood that nothing in the following description of the preferred embodiment should limit the scope of the invention to the preferred embodiment.

Figure 1:
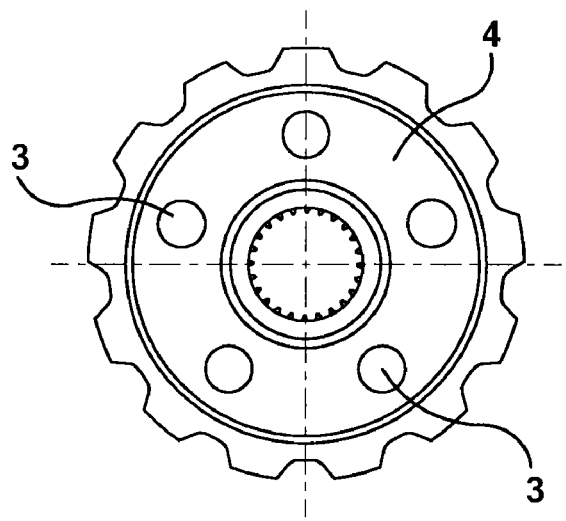
FIG. 1 illustrates a known side gear having symmetrically orientated apertures.
Figure 2:
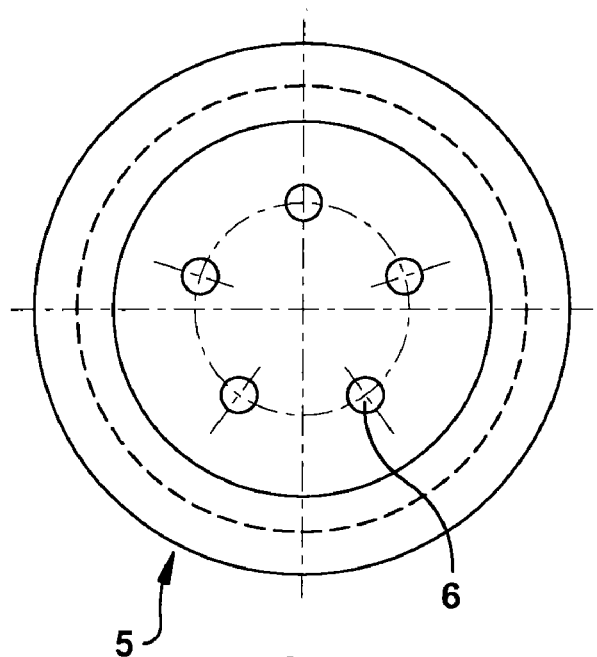
FIG. 2 illustrates a known differential housing having symmetrically orientated locking apertures formed therein.
Figure 3:
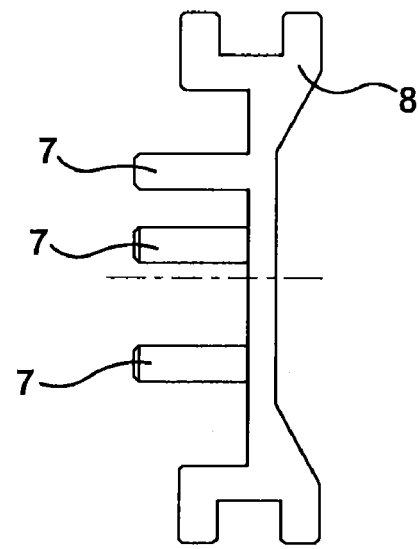
FIG. 3 is a cross-sectional view of a known collar having symmetrically orientated locking pins extending therefrom.
Figure 4:
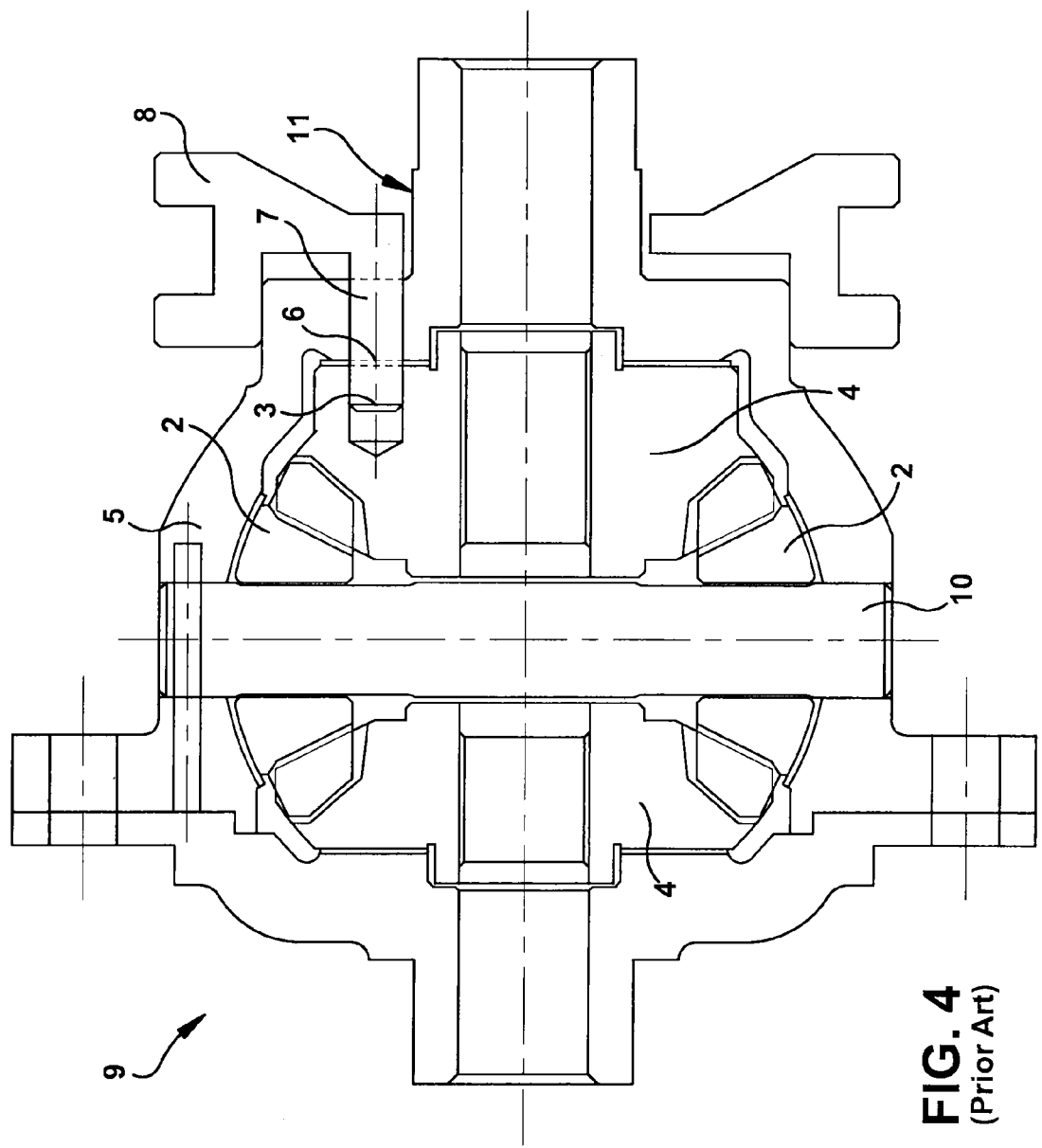
FIG. 4 is a known locking differential assembly having a collar, side gears and pinion gears.
Figure 5:
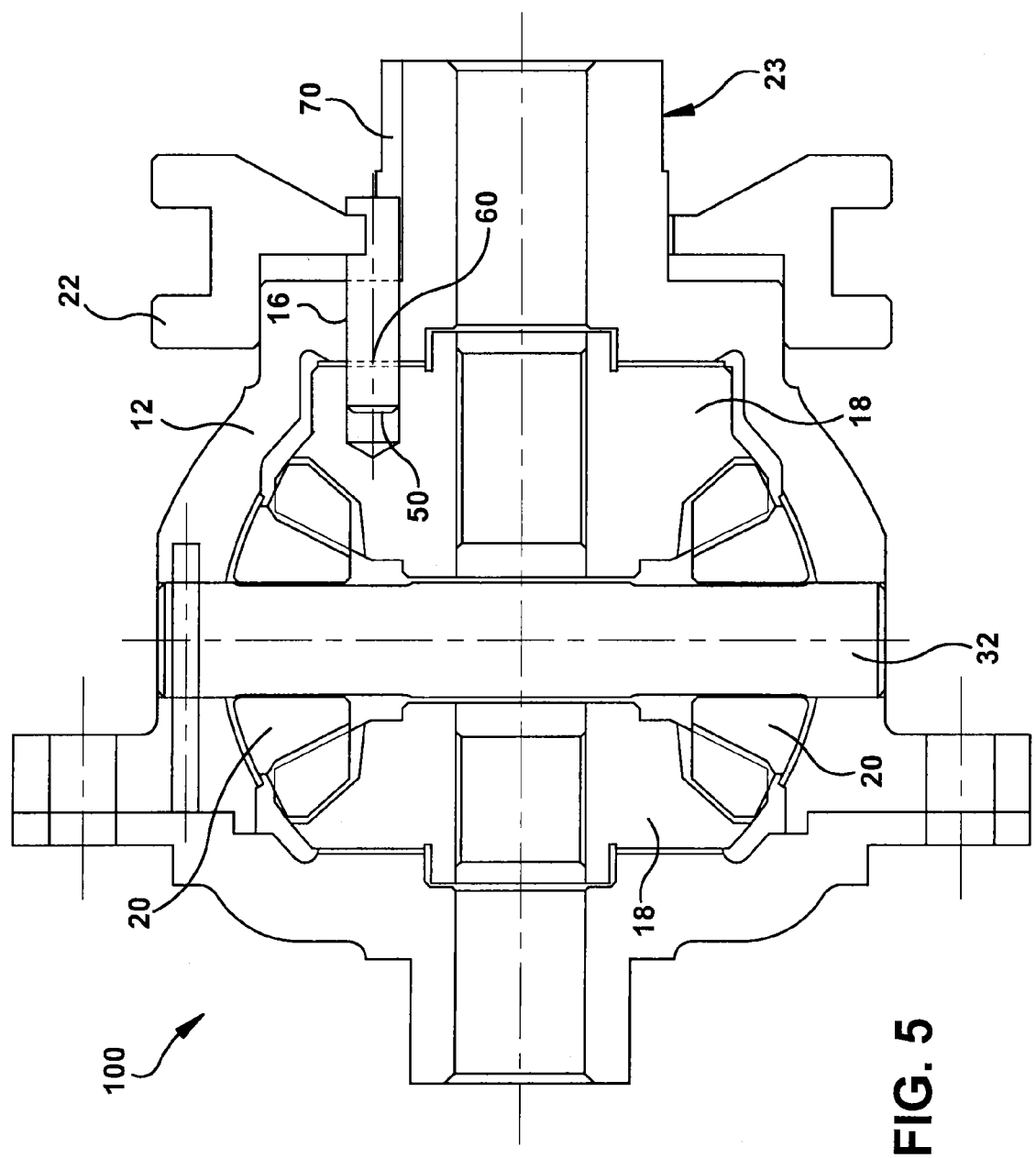
FIG. 5 illustrates a differential assembly having a bearing journal and channels formed therein in an embodiment of the present invention.

FIGS. 5 and 6 illustrate a locking differential assembly 100 in an embodiment of the present invention. The assembly 100 includes a differential housing 12, side gears 18 and pinion gears 20 attached to a pinion shaft 32. The differential housing 12 has a bearing journal 23 therethrough. A collar 22 having locking pins 16 extending therefrom is slidable to engage locking apertures 60 of the housing 12 and apertures 50 in the side gear 18.

The bearing journal 23 has channels 70 as illustrated in FIGS. 5 and 6. The channels 70 may be located radially about the housing 12. In an embodiment, the channels 70 may be formed and/or located within or slightly above the bearing journal 23. In a preferred embodiment, the channels 70 are radially aligned to correspond to the position of the locking apertures 60 and/or the locking pins 16. In such an embodiment, each channel 70 may be sized and shaped to receive a single locking pin 16.

The channels 70 are sized and shaped such that the locking pins 16 are movable within the channels 70. The shape of the channels 70 may be circular, rectangular with rounded corners, oval and/or the like. The present invention should not be deemed as limited to any specific shape and/or length of the channels 70. One of ordinary skill in the art will appreciate that the channels 70 may have many shapes and/or configurations within the spirit of the present invention.

The channels 70 may permit the locking pins 16 to be supported therein. In addition, the channels 70 may permit a larger sized bearing journal 23 of the differential housing 12. Furthermore, the channels 70 may simplify the assembly process of the differential housing 12. FIG. 8 shows the housing 12 having the locking apertures 60 and a plurality of the channels 70 located radially about the housing 12.

FIGS. 7A and 7B illustrate an embodiment of the locking pins 16 having a groove 30. In such an embodiment, the locking pins 16 are modular and manufactured separately from the collar 22. The locking pins 16 may be generally round and elongated members. In one embodiment, the locking pins 16 are cylindrical in shape. The locking pins 16 may have any shape for engaging the locking apertures 60, the apertures 50 of the side gear 18 and/or the collar 22. The locking pins 16 should not be deemed as limited to any specific shape.

It should be noted that the collar 22 and the locking pins 16 can be independently manufactured relatively inexpensively due to the non-complex design of the collar 22 and the locking pins 16. Further, given the modular design, the locking differential assembly 100 can be easily disassembled to replace any component as necessary. In an embodiment, a groove 30 is formed adjacent one of the ends of the locking pin 16. The groove 30 may be a cut-out portion, a slot, a notch and/or the like. The groove 30 is capable of engaging the collar 22 to secure the locking pin 16 to the collar 22.

Figure 11:
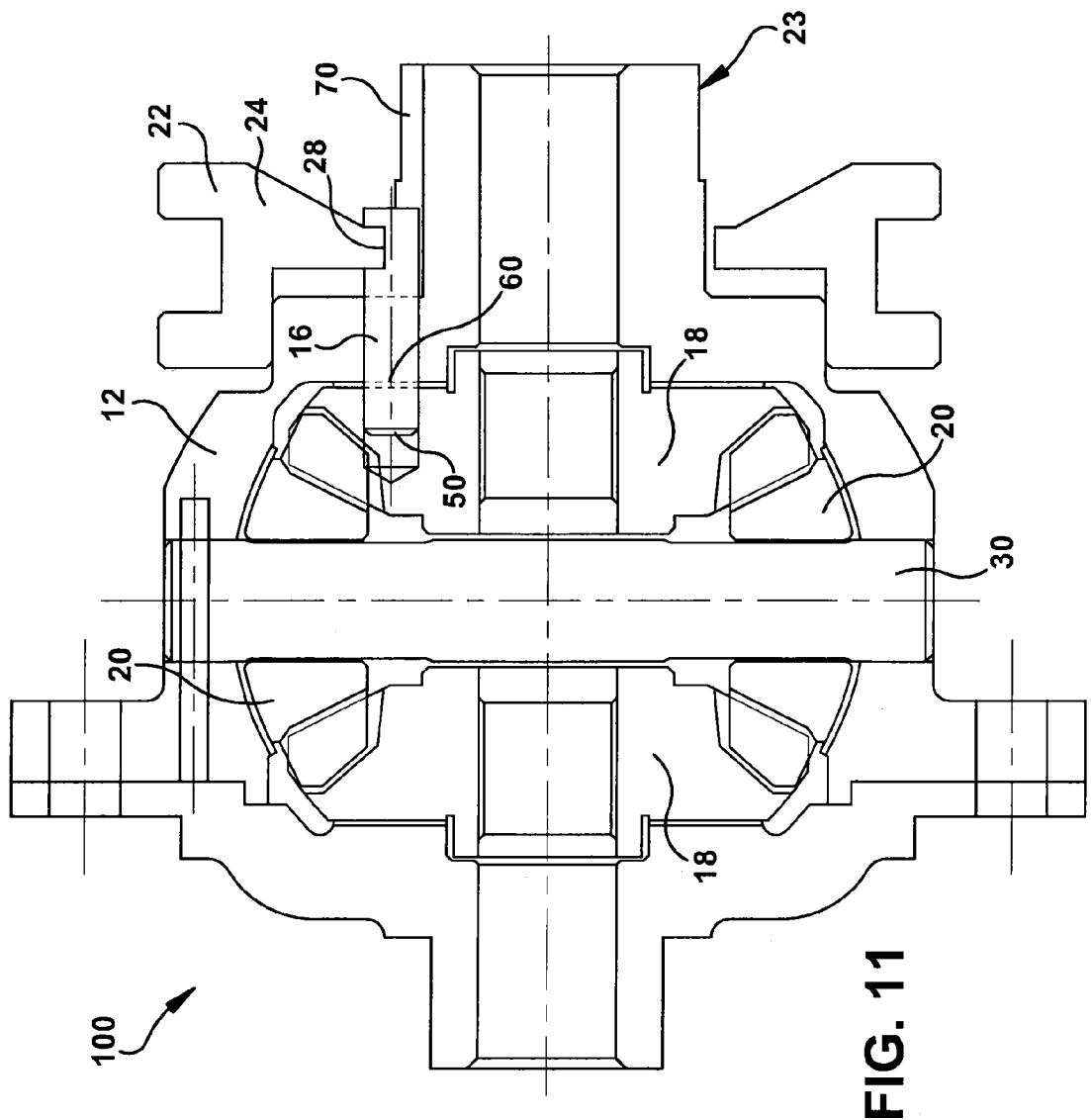
FIG. 11 illustrates a differential assembly having channels and modular locking pins in an embodiment of the present invention.

The groove 30 may engage a body 24 of the collar 22 as shown in FIG. 11. For example, the groove 30 may engage a support aperture 28 of the collar 22. The support aperture 28 is provided in the collar 22 and is sized such that the collar 22 may move axially about said bearing journal 23. Rotation of the collar 22 may lock or otherwise secure the locking pins 16 onto the support aperture 28 of the collar 22.

In a preferred embodiment of the present invention, the support aperture 28 of the collar 22 has a plurality of outward extending half-round apertures 80 as illustrated in FIG. 9. The half-round apertures 80 may correspond in number to the locking apertures 60 in the differential housing 12. In addition, the half-round apertures 80 may correspond in number and in shape to the locking pins 16. In a preferred embodiment, the half-round apertures 80 are shaped for engagement with the groove 30 of each of the locking pins 16. As such, the shape of the half-round apertures 80 may be any shape as will be appreciated by one of ordinary skill in the art.

The half-round apertures 80 are positioned and/or aligned on the grooves 30 of the locking pins 16 prior to rotation of the collar 22 to secure the locking pins 16 to the collar 22 as illustrated in FIG. 11. In one such embodiment, the locking pins 16 may be pre-positioned in the channels 70. The collar 22 may then be axially assembled over the locking pins 16 and rotated to engage the body 24 of the collar 22 into the grooves 30 of the locking pins 16. Thus, the locking pins 16 may be secured by wedge-type engagement with the grooves 30. The collar 22 may be secured from further rotation by methods that will be appreciated by one of ordinary skill in the art, such as, for example, a pin or a screw.

In another embodiment, the collar 22 may not require the half-round apertures 80. While not preferred, such an embodiment may require that the locking pins 16 be pre-positioned onto the body portion 24 of the collar 22 prior to assembly of the collar 22 on the housing 12.

FIG. 10 illustrates a cross-sectional view of the collar 22 of FIG. 9. The collar 22 has the body or flange portion 24, an actuator 26, and the support aperture 28. The support aperture 28 is sized and shaped to engage the bearing journal 23. Preferably, the support aperture 28 is slightly larger in diameter than the outer diameter of the bearing journal 23 so that the collar 22 can be axially assembled onto the bearing journal 23. The collar 22 may, therefore, be capable of sliding or otherwise moving over the bearing journal 23. The actuator 26 of the collar 22 is engaged, for example, mechanically, pneumatically or automatically to move the collar 22.

As illustrated in FIGS. 10 and 11, the collar 22 may be moved axially along the bearing journal 23 so that the locking pins 16 are engagable with the differential housing 12. For example, the locking pins 16 may move into the locking apertures 60 to engage the side gear 18 and lock the differential assembly 100. The locking pins 16 may move axially along the channels 70 so as to maintain a proper position relative to the locking apertures 60.

As shown in FIGS. 1-4, the locking apertures 6 of the housing 5 of the prior art have tended to be oriented symmetrically so that the locking mechanism can engage during each pass of a corresponding side gear aperture. However, the efficient location and number of side gear apertures depends upon the configuration of the side gear. Likewise, the efficient location and number of locking apertures in the differential housing depends upon the configuration of the side gear apertures.

In another embodiment of the present invention, the collar 22 and the locking pins 16 are oriented so as to minimize contact stresses by maximizing the contact areas of the locking pins 16 and the side gear apertures 50. In addition, the present invention may provide a compact sized differential assembly 100 by providing a minimum axial dimension of the side gear 18. A further object of the present invention is to provide design flexibility so that the number of locking pin apertures can be independent of the number of the side gear apertures 50.

Figure 14:
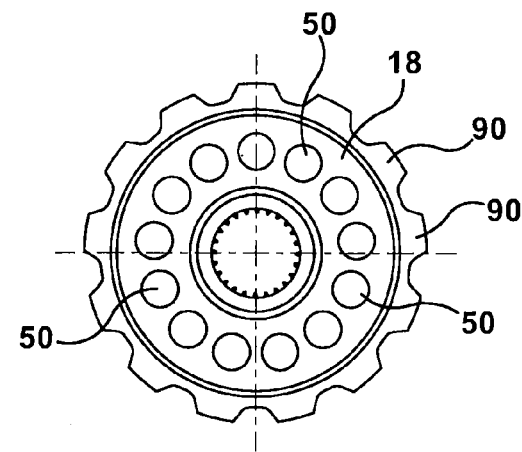
FIG. 14 illustrates a side gear having apertures extending into the side gear at teeth of the side gear in an embodiment of the present invention.

As shown in FIG. 14, the side gear 18 has a plurality of side gear apertures 50 located thereon and/or positioned radially about the side gear 18. In such an embodiment, the side gear 18 may have more apertures 50 than the five symmetrical apertures 3 typically located in the side gear 4 of the prior art. The present invention should not be deemed as limited to any number and/or any location of the side gear apertures 50.

Specifically, FIG. 14 illustrates an embodiment of the present invention where the side gear 18 has thirteen teeth 90 and thirteen side gear apertures 50. The positions of the side gear apertures 50 may be aligned with the location of the teeth 90 of the side gear 18 in such a way that the axis of at least one of the side gear apertures 50 is in the plane which divides one gear tooth 90 into, for example, two equal halves. The present invention should not be deemed as limited to any specific number of the side gear apertures 50 and/or any number of locking apertures 60.

To minimize contact stresses, the overlap length of the locking pins 16 and the side gear apertures 50 should be as large as possible. Deeper side gear apertures 50 may provide longer overlap length of the locking pins 16 and side gear apertures 50. Typically, the deepest side gear apertures 50 can be made in the side gear 18 when the side gear apertures 50 are aligned with the side gear teeth 90. At such a position, the material of the side gear 18 is at a maximum thickness or depth. Otherwise, the side gear apertures 50 may penetrate the gear face or make the gear face too thin to bear load. Thicker side gears 18 can also provide depth of material for deeper side gear apertures 50, but this also results in a larger size and weight of the components and the differential assembly 100.

The number of side gear teeth 90 may be orientated for smooth transmission of torque and rotation speed while minimizing size and weight of the differential assembly 100. The number of locking pins 16 is designed for smooth engagement and disengagement. Advantageously, the present invention seeks to reduce the engagement time of the locking pins 16 with the side gear apertures 50. If, for example, the side gear apertures 50 and the locking apertures 60 in the housing 12 are axially symmetrical, the number of side gear apertures 50 and the number of the locking apertures 60 is required to be equal. Alternatively, the number of side gear apertures 50 is required to be dividable wholly by the number of locking apertures 60 in the housing 12.

Figure 13:
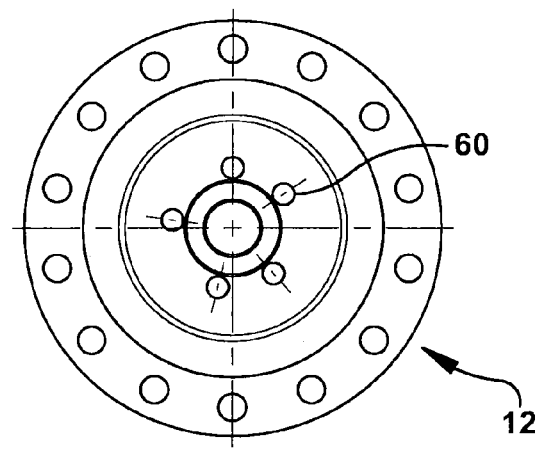
FIG. 13 illustrates a differential housing having asymmetrical locking apertures and channels in an embodiment of the present invention.

As illustrated in FIG. 13, the axially asymmetric pattern of the locking apertures 60 allows the matching of the locking apertures 60 with the side gear apertures 50 even when the number of side gear apertures 50 is not equal to the number of locking apertures 60. In addition, the asymmetric pattern of the locking apertures 60 eliminates the need for having the number of side gear apertures 50 to be dividable wholly by the number of the locking apertures 60. Therefore, the asymmetric pattern allows for the number of the locking apertures 60 in the housing 12 to be independent to the number of side gear apertures 50. Advantageously, such an embodiment provides a differential assembly 100 that does not limit the number of side gear teeth 90 when deep apertures are necessary for large overlap length of the locking apertures 60 and the side gear apertures 50. Furthermore, the quantity and cost of the locking pins 16 and the locking apertures 60 may be reduced while maintaining the integrity of the locking function.

Figure 12A:
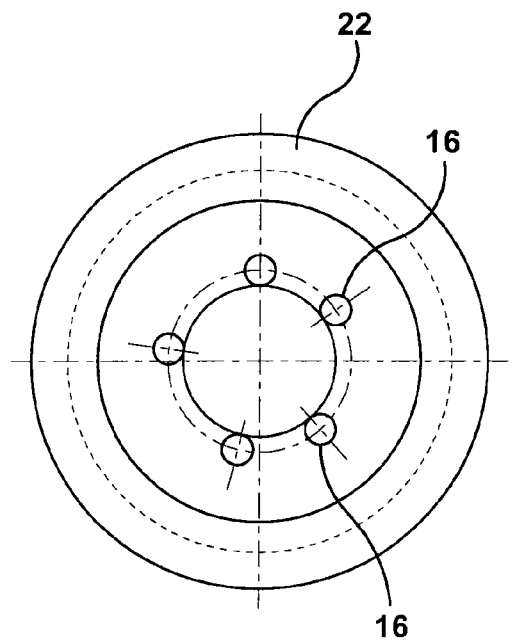
FIG. 12A illustrates a collar having asymmetrical locking apertures in an embodiment of the present invention.
Figure 12B:
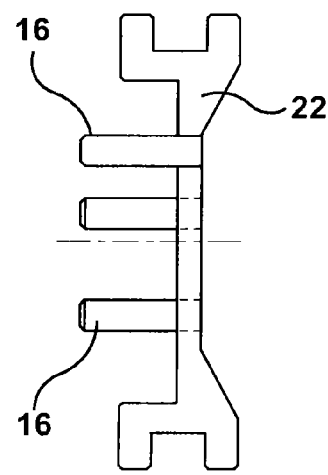
FIG. 12B illustrates a cross-sectional view of the collar of FIG. 12A.

FIGS. 12A and 12B illustrate an embodiment of the present invention where the locking pins 16 are integrally formed with the collar 22 in an asymmetrical pattern. Of course, the collar 22 may have modular locking pins 16 having grooves 30 for engagement with the support aperture 28 of the collar 22 as shown in FIG. 11. Furthermore, in an embodiment the locking pins 16 may lock with the half-round apertures 80 of the collar 22 in an asymmetric pattern.

The collar 22, as illustrated in FIGS. 12A and 12B, have five asymmetrical locking pins 16 attached thereto. The asymmetrical orientation of the locking pins 16 permits engagement at any rotational position without having to provide equal or divisible numbers of side gear apertures 50 and the locking apertures 60.

While the invention has been described with reference to the preferred embodiment, other modification and design changes can be appreciated upon reading the disclosure along with the accompanying drawings. As such, nothing in the present description should be implied to limit the invention from what is claimed below.

Having thus described the invention, we claim:

1. A pin retention and assembly system, comprising:
 a differential housing having a plurality of locking apertures formed therein;
 a bearing journal extending within said differential housing;
 channels formed in said bearing journal;
 a plurality of modular locking pins having grooves formed therein and movable within said channels, said locking pins capable of locking the differential housing;
 a collar positioned about said bearing journal, said collar having a body and a plurality of half-round apertures formed within said body; and
 wherein said collar is rotatable to engage a portion of said body with said grooves.

2. The pin retention and assembly system of claim 1 wherein said half-round apertures are aligned with said locking pins.

3. The pin retention and assembly system of claim 1 wherein each of said locking pins has a corresponding one of said channels for receiving one of said locking pins.

4. The pin retention and assembly system of claim 1 wherein each of the locking pins has a groove formed therein.

5. The pin retention and assembly system of claim 1 wherein said locking pins are cylindrical.

6. The pin retention and assembly system of claim 5 wherein the locking apertures of the differential housing are asymmetrically orientated about the differential housing.

7. The pin retention and assembly system of claim 6 further comprising:
 a side gear having a plurality of apertures wherein the number of said apertures of said side gear is independent of the number of the locking apertures.

8. The pin retention and assembly system of claim 7 wherein the locking pins are orientated asymmetrically about the collar.

9. The pin retention and assembly system of claim 8 wherein the side gear apertures are aligned with teeth of the side gear.

10. The pin retention and assembly system of claim 9 wherein the collar moves toward an interior of said housing such that the locking pins extend through said locking gear apertures and into said side gear apertures.

11. A pin retention and assembly system comprising:
 a differential housing having a plurality of locking apertures;
 a collar rotatable with respect to the housing and having a plurality of half-round apertures formed therein;
 a plurality of locking pins having grooves formed therein, wherein upon rotation of said collar, said grooves engage a portion of said collar adjacent to said half-round apertures to secure the locking pins to said collar, wherein said locking pins are capable of engaging said locking apertures to lock the differential housing.

12. The pin retention and assembly system of claim 11 wherein the locking pins are elongated and cylindrically shaped members.

13. The pin retention and assembly system of claim 12 wherein the collar has an opening corresponding in size to the bearing journal.

14. The pin retention and assembly system of claim 12 wherein the locking pins engage the half-round apertures of the collar and the body of the collar to secure the locking pins to the collar.

15. The pin retention and assembly system of claim 11 further comprising:
 a plurality of channels formed in the differential housing adjacent to the bearing journal, each channel sized to receive at least one locking pin.

16. The pin retention and assembly system of claim 15 wherein the locking pins are positioned asymmetrically about the differential housing.

17. A method for assembling a pin retention system comprising:
 providing a bearing journal having a plurality of channels formed therein;
 inserting locking pins into each of said channels, wherein each of said locking pins has a groove formed therein;
 positioning a collar about said bearing journal and said locking pins, said collar comprising:
 a body;
 a support aperture formed in said body; and
 a plurality of half-round apertures formed in said body and arranged to align with said locking pins; and
 rotating said collar to engage said body with said grooves.

\* \* \* \* \*